United States Patent
Trim et al.

(10) Patent No.: US 11,576,026 B1
(45) Date of Patent: Feb. 7, 2023

(54) VEHICLE CONTAMINATION NOTIFICATION USING AD HOC NETWORKS

(71) Applicant: International Business Machines Corporation, Armonk, NY (US)

(72) Inventors: Craig M. Trim, Ventura, CA (US); Faried Abrahams, Laytonsville, MD (US); Gandhi Sivakumar, Bentleigh (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/398,116

(22) Filed: Aug. 10, 2021

(51) Int. Cl.
*H04W 4/90* (2018.01)
*H04W 4/021* (2018.01)

(52) U.S. Cl.
CPC ............ *H04W 4/90* (2018.02); *H04W 4/021* (2013.01)

(58) Field of Classification Search
CPC ................................ H04W 4/90; H04W 4/021
See application file for complete search history.

(56) References Cited

U.S. PATENT DOCUMENTS

| | | | |
|---|---|---|---|
| 7,751,955 | B2 | 7/2010 | Chinnadurai |
| 11,322,260 | B1* | 5/2022 | Jain ........................ H04W 4/021 |
| 11,412,566 | B2* | 8/2022 | Park .................. H04W 28/0268 |
| 2005/0149358 | A1 | 7/2005 | Sacco |
| 2018/0141521 | A1 | 5/2018 | Irie |
| 2020/0279642 | A1 | 9/2020 | Lee |
| 2020/0304944 | A1 | 9/2020 | Millius |
| 2021/0211842 | A1* | 7/2021 | Pegg ..................... G08B 21/0236 |
| 2022/0046657 | A1* | 2/2022 | Trim ........................ H04W 84/18 |
| 2022/0189072 | A1* | 6/2022 | Velleu ..................... H04W 4/48 |

OTHER PUBLICATIONS

"Auto Defect and Sanitize Objects (Equipment's, Vehicles, Food Items Etc.)", An IP.com Prior Art Database Technical Disclosure, IP.com No. IPCOM000263146D, Aug. 2, 2020, 4 pages.
"COVID-19 HPC Consortium", XSEDE, Printed May 20, 2021, 6 pages, <https://www.xsede.org/covid19-hpc-consortium>.
"The COVID-19 High Performance Computing Consortium", COVID-19 HPC Consortium, Printed May 20, 2021, 9 pages, <https://www.IBM.com/covid19/hpc-consortium>.
"World experts and funders set priorities for COVID-19 research", Worid Health Organization, Feb. 12, 2020, 2 pages, <https://www.who.int/news-room/detail/12-02-2020-world-experts-and-funders-set-priorities-for-covid-19-research>.
Cameron, Alan, "5G, cellular's next step, brings new positioning capabilities", GPS World, Feb. 21, 2018, 7 pages, <https://www.gpsworld.com/5g-cellulars-next-step-brings-new-positioning-capabilities/>.
Etherington, Darrell, "IBM and The Weather Channel launch detailed local COVID-19 maps and data tracking", Techcrunch, Mar. 25, 2020, 10 pages, <https://techcrunch.com/2020/03/25/ibm-and-the-weather-channel-launch-detailed-local-covid-19-maps-and-data-tracking/>.
Gunnarsson et al., "LTE Positioning and RTK: Precision down to the centimeter", Ericsson, Nov. 19, 2019, 8 pages, <https://www.ericsson.com/en/blog/2018/11/lte-positioning-and-rtk-precision-down-to-the-centimeter>.

\* cited by examiner

*Primary Examiner* — Minjung Kim
(74) *Attorney, Agent, or Firm* — Edward J. Wixted, III

(57) ABSTRACT

In an approach, a processor identifies that a vehicle has been exposed to a first user, the first user associated with an infectious disease. A processor monitors, via a wireless ad hoc network, presence of a mobile device at a location of the vehicle. A processor identifies the presence of the mobile device at the location of the vehicle. A processor sends a notification to the mobile device, the notification specifying that the vehicle has been exposed to the infectious disease.

14 Claims, 3 Drawing Sheets

VEHICLE CONTAMINATION NOTIFICATION USING AD HOC NETWORKS

BACKGROUND

The present invention relates generally to the field of preventing the spread of infectious diseases, and more particularly to generating notifications to send to devices via an ad hoc network to warn such devices of surfaces of the vehicle that may be contaminated with an infectious disease.

Communicable or infectious diseases are caused by microorganisms that can be spread, directly or indirectly, from one person to another. The stability of various microorganisms may vary based on a variety of factors such as, but not limited to, temperature, humidity, and surface type. Depending on the type of infectious disease, people may be able to contract the disease based on physical contact with a surface on which the respective microorganisms are present.

Ad hoc networks are decentralized wireless networks. Such networks are ad hoc because they do not rely on a preexisting infrastructure, such as routers or access points. Instead, each node participates in routing by forwarding data for other nodes, so the determination of which nodes forward data is made dynamically on the basis of network connectivity and routing algorithm(s) in use.

SUMMARY

According to one embodiment of the present invention, a computer-implemented method, computer program product, and computer system are provided. A processor identifies that a vehicle has been exposed to a first user, the first user associated with an infectious disease. A processor monitors, via a wireless ad hoc network, presence of a mobile device at a location of the vehicle. A processor identifies the presence of the mobile device at the location of the vehicle. A processor sends a notification to the mobile device, the notification specifying that the vehicle has been exposed to the infectious disease.

DETAILED DESCRIPTION

Embodiments of the present invention recognize that in situations where, for example, contact tracing technologies are being utilized to monitor and/or track persons who have contracted an infectious disease, or may be at high risk of contracting the infectious disease, such persons may travel through public areas where they risk infecting other individuals. For example, an infected person may need to go to a medical appointment. Embodiments of the present invention recognize that, even when traveling in a personal vehicle (e.g., car, motorcycle, bike), there are still risks that surfaces of the personal vehicle may carry the infection (i.e., have microorganisms on a surface) and potentially increase a risk of exposing others. For example, an infected individual may open a car door, leaving viral or bacterial microorganisms on the door handle and, if another person touches the door handle, there is a risk that the other person may become exposed to the viral or bacterial microorganism and contract an infectious disease. Embodiments of the present invention describe an approach to identify potentially infected vehicles and generate notifications warning users of the possible infection present on one or more vehicle surface(s).

The present invention will now be described in detail with reference to the Figures.

Figure 1:
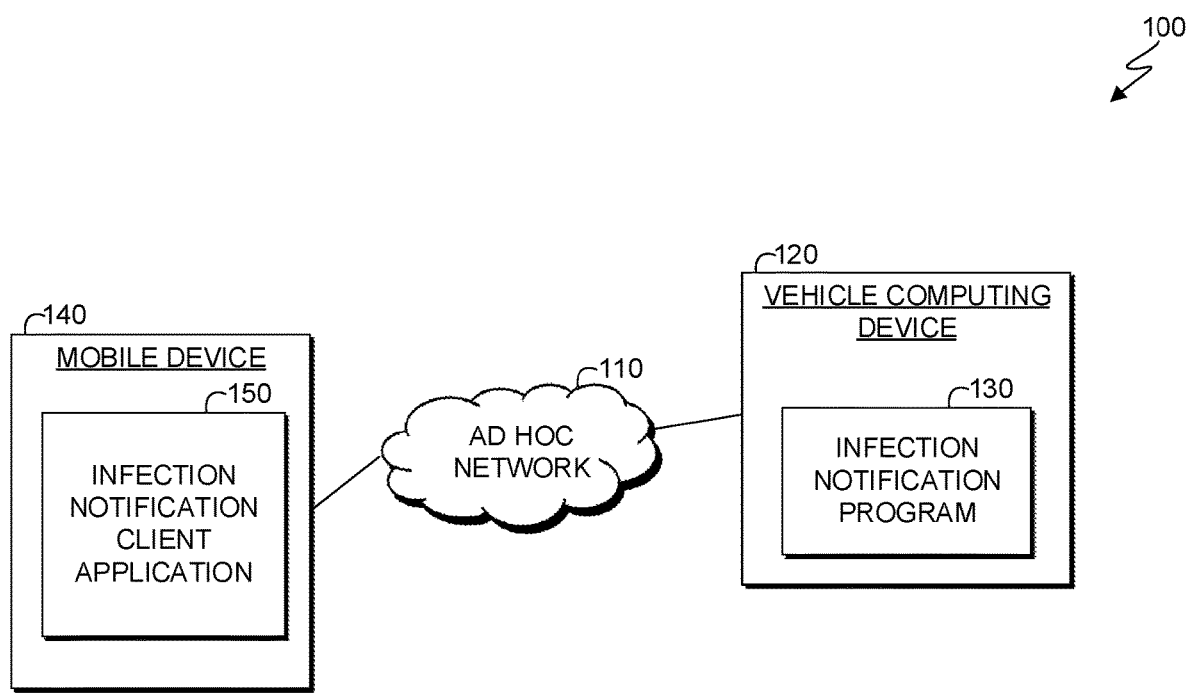
FIG. 1 is a functional block diagram illustrating a computer environment, in accordance with an embodiment of the present invention.

FIG. 1 is a functional block diagram illustrating a computing environment, generally designated 100, in accordance with one embodiment of the present invention. FIG. 1 provides only an illustration of one embodiment and does not imply any limitations with regards to the environments in which different embodiments may be implemented.

In the depicted embodiment, computing environment 100 includes vehicle computing device 120 and mobile device 140 interconnected over ad hoc network 110.

Ad hoc network 110 may be an ad hoc network capable of data exchange that allows communication with other vehicles, users in the vehicle, and users within a certain geographic proximity of the vehicle. Ad hoc network 110 may be, for example, a 5G ad hoc Dedicated Traffic Channel (DTCH). A DTCH is used for transmission of data to/from user equipment. Ad hoc network 110 may be Bluetooth®, Wi-Fi®, or any other short or mid distance wireless communication mechanism. Ad hoc network 110 may utilize virtual network functions (VNFs), which are virtualized network services running on open computing platforms that can include, for example, virtualized routers, firewalls, WAN optimization, and network address translation (NAT) services.

Vehicle computing device 120 is a computing device that is internal or otherwise operable affixed to a vehicle. In some embodiments, vehicle computing device 120 controls aspects of the vehicle. In some embodiments, vehicle computing device 120 is a vehicle control unit (VCU). In general, vehicle computing device 120 may be any electronic device or computing system capable of sending and receiving data and communicating with mobile device 140 via ad hoc network 110. Vehicle computing device 120 is capable of generating ad hot network 110 utilizing, for example, 5G ad hoc DTCH, Wi-Fi®, Bluetooth®, or any other short or mid distance wireless communication mechanism. Vehicle computing device 120 includes infection notification program 130. Vehicle computing device 120 may include components, as depicted and described in further detail with respect to FIG. 3.

Infection notification program 130 operates to, upon identifying that a user within the vehicle has been infected with an infectious disease or is otherwise at risk of having the infectious disease, generate an ad hoc network, such as ad hoc network 110 and broadcast notifications to nearby mobile devices, such as mobile device 140, as to possible surface contamination in order to prevent users of mobile device 140 from exposure. In on embodiment, infection notification program 130 resides on vehicle computing device 120. In other embodiments, infection notification program 130 may reside on another server, or another computing device, provided that infection notification program 130 can communicate with vehicle computing device 120, mobile device 140, and/or infection notification client application 150.

Mobile device 140 may be a desktop computer, laptop computer, netbook computer, tablet computer, personal digital assistant (PDA), smartphone, or vehicle computing device. In general, mobile device 140 may be any electronic device or computing system capable of sending and receiving data and communicating with vehicle computing device 120 and/or infection notification program 130 via ad hoc network 110. Mobile device 140 contains infection notification client application 150. Instances of mobile device 140 may be associated with a user inside of the vehicle (e.g., an infected user) or other users to whom infection notification program 130 may aim to warn or otherwise notify of possible exposure risk via the creation of ad hoc network 110 and the generation of a notification to be presented on mobile device 140. Mobile device 140 may include components, as depicted and described in further detail with respect to FIG. 3.

Infection notification client application 150 is a client application or program that operates to generate notifications on mobile device 140 in response to receiving information from infection notification program 130 indicating that one or more surfaces of the vehicle are potentially contaminated with an infectious disease. In some embodiments, infection notification client application 150 allows a user of mobile device 140 to input personal infection status (e.g., type of disease, when diagnosed, expected recovery time), desired notification settings, types of infectious diseases to generate notifications, privacy settings, and any other customization options that may be desirable by a user of mobile device 140. Privacy settings may allow a user to select the type of information that infection notification program 130 might have access to, and the type of notifications that infection notification program 130 may be able to send. For example, a user may elect to restrict infection notification program 130 such that only push notifications may be generated at mobile device 140. In some embodiments infection notification client application 150 may be a function of a contact tracing application. A contact tracing application is an application for digital contact tracing used to identify persons or contacts who may have been in contact with infected individuals. Contact tracing applications may use, for example, Bluetooth® signals to log a user's proximity to other mobile devices. In such an embodiment, notification client application 150 may provide an interface to update their infection status such as, when they test positive for an infectious disease, in order to update their status to infected. Similarly, users who have been exposed to an infectious disease may have their status updated to reflect the possible exposure.

Figure 2:
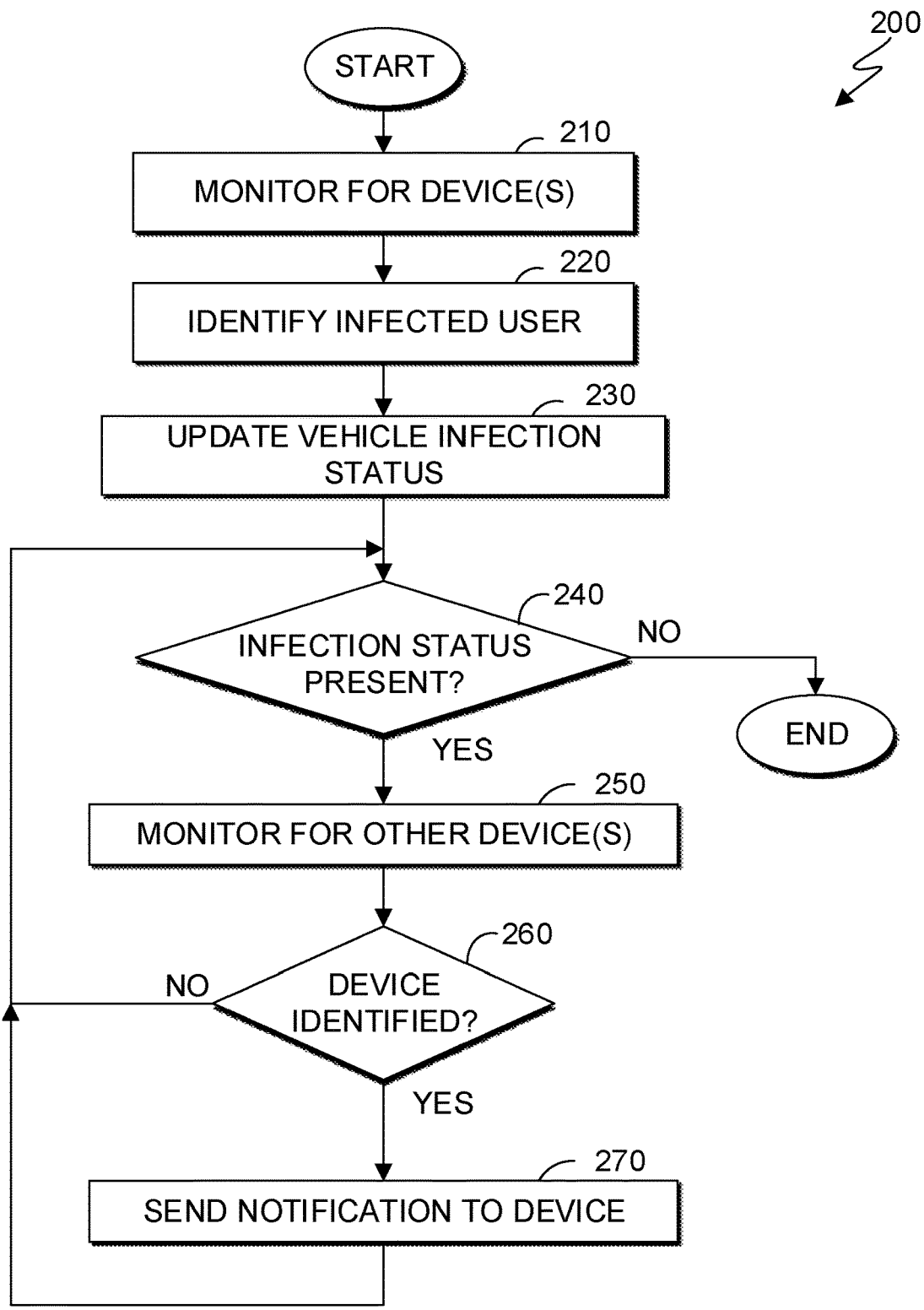
FIG. 2 is a flowchart depicting operation steps of an infection notification program executing within the computer environment of FIG. 1 sending notifications to other devices, via an ad hoc network, as to possible surface contamination on a vehicle that may cause risk of contracting an infectious disease, in accordance with an embodiment of the present invention.

FIG. 2 depicts a flowchart 200 for the steps of infection notification program 130, executing within vehicle computing device 120 of computing environment 100 of FIG. 1, for generating and sending notifications relating to infectious disease exposure with respect to a vehicle corresponding to vehicle computing device 120 via an ad hoc network, such as ad hoc network 110 generated by vehicle computing device 120, in accordance with an embodiment of the present invention.

In one embodiment, initially a first user (hereinafter referred to as the "infected user") associated with a first mobile device 140 operates or is a passenger in the vehicle associated with vehicle computing device 120. In some embodiments, the infected user has updated their status within infection notification client application to indicate that they have been infected, or have been exposed to, an infectious disease.

In step 210, infection notification program 130 monitors for the presence of devices within or near the vehicle. Infection notification program 130 initiates a shorter or mid-range distance communication medium, such as Bluetooth®, Wi-Fi®, or 5G based communication technologies to identify the presence of one or more mobile devices 140. In some embodiments, infection notification program 130 may identify the presence of a device via a direct connection to vehicle computing device 120 via, for example, a Universal Serial Bus (USB) or other type of connection. Infection notification program 130 may monitor for the presence of devices continuously, periodically, or in response to particular events. For example, in some embodiments, infection notification program 130 initiates and begins monitoring for devices upon turning on the vehicle, opening a door/window, or identifying a change in passenger weight readings (e.g., utilizing weight sensors in one or more seats of the vehicle). In some embodiments, infection notification program 130 is able to determine a boundary area surrounding the vehicle using, for example, Bluetooth® location finding mechanisms or 5G ad hoc relative location finding services. Using such technologies, infection notification program 130 may be able to determine whether the user is a passenger within the vehicle, or close enough to the vehicle to potentially make physical or contact with the vehicle or otherwise contaminate a surface of the vehicle with an infectious disease (e.g., by maintaining a short distance from the vehicle such that respiratory droplets may make contact with a surface of the vehicle). In some embodiments, infection notification program 130 compares vehicle movement trajectory with trajectory of mobile device 140 and, based on the trajectory profiles matching, within a predefined threshold, infection notification program 130 determines that mobile device 140 is associated with a user that is a driver or passenger of the vehicle.

In step 220, infection notification program 130 identifies an infected user. Infection notification program 130 receives or, in some embodiments, queries each monitored mobile device 140 for status information relating to infection status for the user. For example, status information from infection notification client information 150 of mobile device 140 that is associated with a user may indicate that the user is infected with an infectious disease or is at a high risk of having been exposed to an infectious disease (e.g., a close contact, as determined by a contact tracing application). In some embodiments, infection notification program 130 may be a function of a contact tracing application and infection notification client application may have automatically identified the user of mobile device 140 as a close contact to an infected person and, accordingly, the status of the user may be changed to infected or at risk of having been exposed to an infectious diseases as a result of the close contact determination. In some embodiments, the status information relating to the infection status of the user may include additional information, such as the type of infectious disease the user is, or may be, infected with. If no infected users are identified, the process is complete until infection notification program 130 monitors for device(s) again (e.g., periodically, in response to a particular event, see step 210).

In step 230, infection notification program 130 updates the infection status of the vehicle to reflect the identified infected user. In general, the infection status indicates that an infected user has been in or near the vehicle such that the vehicle may include surfaces that are contaminated with an infectious disease. In general, infection notification program 130 will maintain the infected status until receiving a notification from a user that, for example, the vehicle has been cleaned or otherwise sterilized. In some embodiments, infection notification program 130 may have been sent the type of infectious disease that the infected user is carrying. In such embodiments, the infection status may automatically be reset (i.e., infection status removed from the vehicle) over a predetermined period of time. In general, infectious diseases caused by microorganisms (e.g., bacteria, viruses, parasites, fungi) may only be able to survive on particular surfaces for a period of time. As such, in some embodiments, infection notification program 130 may have access to a database corresponding to properties of infectious diseases such as surface type, temperature, humidity, or other factors that may impact how long a surface might retain enough viable microorganism presence to facilitate transmission of the respective infectious disease. In other embodiments, infection notification program 130 may obtain such information with the data received from mobile device 140 (see step 220). For example, infection notification client application 150 may send the type of infectious disease to vehicle computing device 120, along with information about the viability of the infectious disease on various types of surfaces of an automobile. In some embodiments, infection notification program 130 may use such information, in conjunction with sensors of the vehicle (e.g., temperature sensors, humidity sensors), to determine the period of time that the vehicle shall have the infection status. Weather conditions, such as temperature and humidity, may cause infection notification program 130 to shorten or lengthen the amount of time that the vehicle remains with an infection status.

In decision 240, infection notification program 130 determines whether the infection status for the vehicle is still present. As described above, upon updating the infection status to infected, infection notification program 130 will change the status back to uninfected (or otherwise remove the status) after a user notifies infection notification program 130 that the vehicle has been cleaned or if a period of time has passed. As described above, in some embodiments, the period of time is based on the type of infectious disease and/or information relating to viability of microorganisms associated with the infectious disease on different surfaces and in different weather scenarios (e.g., temperature, humidity). If any of those factors have caused infection notification program 130 to update the status to no longer reflect that the vehicle is no longer contaminated with an infectious disease, infection notification program 130 determines that the infection status is no longer present (decision 240, no branch), the program is complete.

If infection notification program 130 determines that the infection status for the vehicle is present (decision 240, yes branch), infection notification program 130 monitors for other devices, such as other instances of mobile device 140 (step 250), via ad hoc network 110. Infection notification program 130 reinitiates (or resumes) ad hoc network 110, which is a shorter or mid-range distance communication medium generated by the vehicle, or a computing device located within the vehicle, such as the communication mediums discussed with respect to step 210 and monitors for the presence of other mobile devices 140 in addition to the instance of mobile device 140 that is associated with the infected user. In some embodiments, infection notification program 130 may generate multiple ad hoc networks. For example, infection notification program 130 may cause the vehicle or computing device located within the vehicle to utilize both a 5G based ad hoc DTCH and a Bluetooth® based infrastructure to generate multiple ad hoc networks 110, such that a variety of devices with different communication technology capabilities may be able to be communicated with by infection notification program 130. In some embodiments, infection notification program 130 creates the ad hoc network 110 by causing the VCU to initiate a monitoring daemon that polls for ad hoc connection requests from other mobile devices 140. Infection notification program 130 may use VNFs and network programmability framework to trigger 5G dynamic ad hoc based network creation between vehicle computing device 120 and mobile device 140.

In some embodiments, infection notification program 130 only monitors for other devices, such as other instances of mobile device 140, when the vehicle is in a parked state. In such embodiments, it is presumed that there is a higher likelihood of external users coming in contact with the vehicle if the vehicle is parked than the risk of contact when the vehicle is in motion.

In some embodiments, infection notification program 130 specifically monitors for the presence of other mobile devices 140 that are present within a defined boundary of the vehicle. The boundary area determination may be performed by, for example, Bluetooth® location finding techniques or 5G ad hoc network relative location finding services. The boundary may specify a particular distance from the vehicle or may be tiered such that there are multiple boundaries at multiple distances around the vehicle that are associated with different notification policies. In general, the boundary area may be defined by a distance from the center of the vehicle (e.g., radius of the boundary area) or center of the component of the vehicle that is generating the signal used to create ad hoc network 110.

In decision 260, infection notification program 130 determines whether another mobile device 140 has been identified. Infection notification program 130 is monitoring for additional devices using as hoc network 110, as described above. Infection notification program 130 determines whether another mobile device 140 has been identified if infection notification program 130 successfully connects with another device via ad hoc network 110. In some embodiments, even if infection notification program 130 successfully connects with another device 140, infection notification program 130 only determines that the device has been identified if the device falls within the defined boundary of the vehicle, as described above. Infection notification program 130 may utilize such an approach when, for example, ad hoc network 110 covers a large area as the risks of coming in contact with contaminated surfaces decrease as the user's distance from the vehicle increases.

If infection notification program 130 does not identify another mobile device 140 (decision 260, no branch), infection notification program 130 determines whether the infection status is still present on the vehicle (decision 240) and, if so (decision 240, yes branch), continues to monitor for other devices (step 250).

If infection notification program 130 identifies another mobile device 140 (decision 260, yes branch), infection notification program 130 sends a notification to the identified mobile device 140. In some embodiments, infection notification program 130 sends a text message, push notification, automated telephone call, instruction for the mobile device to generate haptic, audio, or other feedback, or any other type of notification. In some embodiments, infection notification program 130 causes mobile device 140 to generate a natural language notification such as, for example, "Stay away from that car!" that may be sent via text message or audio alert using, for example, virtual assistant software associated with mobile device 140. In some embodiments, rather than causing a notification to be generated on mobile device 140, infection notification program 130 causes the vehicle to generate a notification. For example, infection notification program 130 may cause an audio alert to be generated by speakers of the vehicle warning the nearby users of possible contamination of the vehicle with regards to an infectious disease. In some embodiments, the type(s) of notifications that infection notification program 130 generates are specified by predefined policies associated with infection notification program 130. In other embodiments, a user may specify notification settings and policies within infection notification client application 150 in order to customize the type of notifications that the user receives (e.g., after receiving a vaccination for infectious disease A, the user may not want to receive notifications that a vehicle is possibly contaminated by infectious disease A). In such embodiments, infection notification program 130 may merely send the notification to mobile device 140 and infection notification client application 150 may process the notification and determine how, or whether, to deliver the notification to the user based on the user's notification settings.

In embodiments where the policies are specified at vehicle computing device 120, infection notification program 130 may send specific types of notifications to mobile device 140 or specific instructions to mobile device 140 to cause mobile device 140 to generate the desire haptic, audio, and/or visual notification on mobile device 140. In some embodiments, a user of mobile device 140 may be able to grant external devices, such as vehicle computing device 120 access to audio, haptic, or other system access facilities to enable infection notification program 130 to generate notifications on mobile device 140. In such embodiments, infection notification program 130 may have access to permissions that enable infection notification program 130 to generate haptic feedback, increase the volume of notifications, or perform other actions on mobile device 140. The information included in the generated notifications may include, for example, a description of the vehicle, license plate number of the vehicle, warning of the type of infectious disease that the vehicle is at risk of contamination for, or other information.

In embodiments where infection notification program 130 is able to the user's distance from the vehicle via the connection to ad hoc network 110, infection notification program 130 may send multiple notifications with instructions to cause each notification to be presented when particular distance thresholds are crossed. For example, infection notification program 130 cause the following notifications to be generated: (i) when mobile device 140 is within one hundred meters of the vehicle, a text message is sent to mobile device 140; (ii) when mobile device 140 is within twenty meters of the vehicle, a call is sent to mobile device 140 and haptic feedback (e.g., vibration) is provided; and (iii) when mobile device 140 is within fifteen meters of the vehicle an audio alert or warning is generated by mobile device 140 and/or the vehicle. In general, infection notification program 130 may vary the type and intensity of the notification as the user gets closer to the vehicle. In some embodiments the trajectory of the user (e.g., direction, velocity) at which mobile device 140 is approaching the vehicle may cause infection notification program 130 to change the variety and/or intensity of the notifications (e.g., a faster velocity in the direction of the vehicle may cause infection notification program 130 to increase the variety and intensity of notifications).

In some embodiments, infection notification program 130 may utilize notifications to cause a user to avoid the vehicle beyond merely sending notifications that include a warning to the user. For example, in one embodiment, infection notification program 130 may have access (e.g., via user settings enabled on infection notification client application 150) to route planning applications. For example, if a user is using a mapping application to provide walking directions along a route, infection notification program 130 can determine that the user's route is going to pass close to the vehicle and, in response, cause the route to be altered such that the route does not pass close to the vehicle, thus reducing the user's risk of exposure to the infection disease that may be present on surfaces of the vehicle.

Subsequent to sending notifications to mobile device 140, infection notification program 130 returns to decision 240 and determines whether the infection status of the vehicle is still present. Upon infection notification program 130 determining that the infection status of the vehicle is no longer present (decision 240, no branch), the program is complete.

Figure 3:
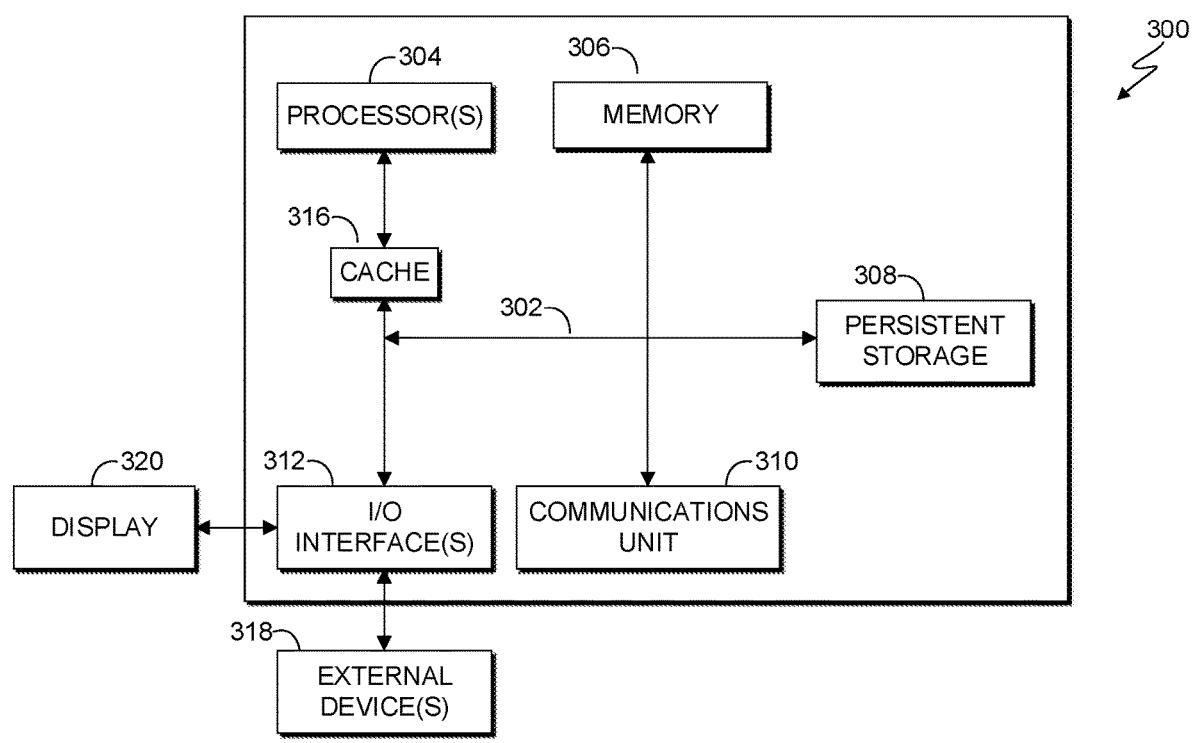
FIG. 3 is a block diagram of components of the mobile device and the vehicle computing device of FIG. 1, in accordance with an embodiment of the present invention.

FIG. 3 depicts a block diagram of components of vehicle computing device 120 and mobile device 140 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Vehicle computing device 120 and mobile device 140 each include communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Infection notification program 130 may be stored in persistent storage 308 of vehicle computing device 120 and in memory 306 of vehicle computing device 120 for execution by one or more of the respective computer processors 304 of vehicle computing device 120 via cache 316 of vehicle computing device 120. Infection notification client application 150 may be stored in persistent storage 308 of mobile device 140 and in memory 306 of mobile device 140 for execution by one or more of the respective computer processors 304 of mobile device 140 via cache 316 of mobile device 140. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Infection notification program may be downloaded to persistent storage 308 of vehicle computing device 120 through communications unit 310 of vehicle computing device 120. Infection notification client application 150 may be downloaded to persistent storage 308 of mobile device 140 through communications unit 310 of mobile device 140.

I/O interface(s) 312 allows for input and output of data with other devices that may be connected to server computer 102. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., infection notification program 130 and infection notification client application 150, can be respectively stored on such respective portable computer readable storage media and can be loaded onto respective persistent storage 308 via respective I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    identifying, by one or more processors, that a vehicle has been exposed to a first user, the first user associated with an infectious disease;
    monitoring, by one or more processors, via a wireless ad hoc network, presence of a mobile device at a location of the vehicle, wherein the wireless ad hoc network is a 5G ad hoc Dedicated Traffic Channel (DTCH);
    identifying, by one or more processors, the presence of the mobile device at the location of the vehicle;
    sending, by one or more processors, a notification to the mobile device, the notification specifying that the vehicle has been exposed to the infectious disease.

2. The computer-implemented method of claim 1, wherein the notification further comprises an instruction to alter movement of a second user associated with the mobile device in a direction that is away from the vehicle.

3. The computer-implemented method of claim 1, further comprising:
    identifying, by one or more processors, a distance between the vehicle and the mobile device; and
    wherein identifying the presence of the mobile device at the location of the vehicle further comprises identifying the presence of the mobile device within a boundary area surrounding the vehicle, the boundary area having a radius greater than the distance.

4. The computer-implemented method of claim 1, wherein the notification comprises a plurality of notifications, each of the plurality of notifications: (i) of a different type of notification and (ii) triggered upon the mobile device crossing a respective predefined threshold distance away from the vehicle associated with the respective notification of the plurality of notifications.

5. The computer-implemented method of claim 1, wherein the notification is selected from the group consisting of: text message, telephone call, haptic feedback, and audio alert generated by the vehicle.

6. A computer program product comprising:
    one or more computer readable storage media, and program instructions collectively stored on the one or more computer readable storage media, the program instructions comprising:
    program instructions to identify that a vehicle has been exposed to a first user, the first user associated with an infectious disease;
    program instructions to monitor, via a wireless ad hoc network, presence of a mobile device at a location of the vehicle, wherein the wireless ad hoc network is a 5G ad hoc Dedicated Traffic Channel (DTCH);
    program instructions to identify the presence of the mobile device at the location of the vehicle;
    program instructions to send a notification to the mobile device, the notification specifying that the vehicle has been exposed to the infectious disease.

7. The computer program product of claim 6, wherein the notification further comprises an instruction to alter movement of a second user associated with the mobile device in a direction that is away from the vehicle.

8. The computer program product of claim 6, further comprising:
    program instructions, collectively stored on the one or more computer readable storage media, to identify a distance between the vehicle and the mobile device; and
    wherein program instructions to identify the presence of the mobile device at the location of the vehicle further comprise program instructions, collectively stored on the one or more computer readable storage media, to identify the presence of the mobile device within a boundary area surrounding the vehicle, the boundary area having a radius greater than the distance.

9. The computer program product of claim 6, wherein the notification comprises a plurality of notifications, each of the plurality of notifications: (i) of a different type of notification and (ii) triggered upon the mobile device crossing a respective predefined threshold distance away from the vehicle associated with the respective notification of the plurality of notifications.

10. The computer program product of claim 6, wherein the notification is selected from the group consisting of: text message, telephone call, haptic feedback, and audio alert generated by the vehicle.

11. A computer system comprising:
one or more computer processors, one or more computer readable storage media, and program instructions collectively stored on the one or more computer readable storage media for execution by at least one of the one or more computer processors, the program instructions comprising:
program instructions to identify that a vehicle has been exposed to a first user, the first user associated with an infectious disease;
program instructions to monitor, via a wireless ad hoc network, presence of a mobile device at a location of the vehicle, wherein the wireless ad hoc network is a 5G ad hoc Dedicated Traffic Channel (DTCH);
program instructions to identify the presence of the mobile device at the location of the vehicle;
program instructions to send a notification to the mobile device, the notification specifying that the vehicle has been exposed to the infectious disease.

12. The computer system of claim 11, wherein the notification further comprises an instruction to alter movement of a second user associated with the mobile device in a direction that is away from the vehicle.

13. The computer system of claim 11, further comprising:
program instructions, collectively stored on the one or more computer readable storage media for execution by at least one of the one or more computer processors, to identify a distance between the vehicle and the mobile device; and
wherein program instructions to identify the presence of the mobile device at the location of the vehicle further comprise program instructions, collectively stored on the one or more computer readable storage media, to identify the presence of the mobile device within a boundary area surrounding the vehicle, the boundary area having a radius greater than the distance.

14. The computer system of claim 11, wherein the notification comprises a plurality of notifications, each of the plurality of notifications: (i) of a different type of notification and (ii) triggered upon the mobile device crossing a respective predefined threshold distance away from the vehicle associated with the respective notification of the plurality of notifications.

\* \* \* \* \*